US008810799B2

(12) United States Patent
Nishikawa

(10) Patent No.: US 8,810,799 B2
(45) Date of Patent: Aug. 19, 2014

(54) HEIGHT-MEASURING METHOD AND HEIGHT-MEASURING DEVICE

(71) Applicant: Nikon Corporation, Tokyo (JP)

(72) Inventor: Takashi Nishikawa, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/670,133

(22) Filed: Nov. 6, 2012

(65) Prior Publication Data

US 2013/0155415 A1 Jun. 20, 2013

Related U.S. Application Data

(63) Continuation of application No. PCT/JP2011/002560, filed on May 6, 2011.

(30) Foreign Application Priority Data

May 7, 2010 (JP) ................................. 2010-106870

(51) Int. Cl.
*G01B 11/24* (2006.01)
(52) U.S. Cl.
USPC .......................................... 356/601; 356/625
(58) Field of Classification Search
CPC ........ G01B 11/24; G01B 11/30; G01B 11/14; G01B 11/28
USPC ......................................... 356/601, 625, 630
See application file for complete search history.

(56) References Cited

U.S. PATENT DOCUMENTS 4,498,777 A * 2/1985 Scott .............................. 356/601

FOREIGN PATENT DOCUMENTS

| JP | 10-281743 | 10/1998 |
|---|---|---|
| JP | 11-51647 | 2/1999 |
| JP | 11-148811 | 6/1999 |
| JP | 2000-9444 | 1/2000 |
| JP | 2001-280925 | 10/2001 |
| JP | 2011-289621 | 10/2001 |

(Continued)

OTHER PUBLICATIONS

English-language International Search Report from Japanese Patent Office for International Application No. PCT/JP2011/002560, mailed June 14, 2011.

*Primary Examiner* — Roy M Punnoose
(74) *Attorney, Agent, or Firm* — Finnegan, Henderson, Farabow, Garrett & Dunner LLP

(57) ABSTRACT

A height-measuring device (100) in which the focal position of an image-forming optical system (20) is moved in relative fashion in the direction of an optical axis with respect to an object (10) to be measured; scanning is performed; images of the object (10) to be measured, which are formed by the image-forming optical system (20), are obtained in order; and the focal position for individual pixels of the images is found, thereby yielding a relative height value of the object to be measured (10) at positions corresponding to the pixels; wherein a second function (g) is defined on the basis of a first function (f) fitted to a numerical value sequence comprising a coordinate value on the optical axis and a light intensity value for the pixels of a plurality of the images obtained by the scanning, or the coordinate value and a numerical value obtained by processing the light intensity value; and positions on the optical axis at which a correlation value between the numerical value sequence and the second function (g) becomes a maximum value or a minimum value serve as the relative height values of the object to be measured at the positions corresponding to the pixels.

11 Claims, 11 Drawing Sheets

(56) References Cited

FOREIGN PATENT DOCUMENTS

| | | |
|---|---|---|
| JP | 2003-207320 | 7/2003 |
| JP | 2010-66155 | 3/2010 |
| JP | 2010-66156 | 3/2010 |

\* cited by examiner f  g

THRESHOLD VALUE f  g

THRESHOLD VALUE f  g f  g

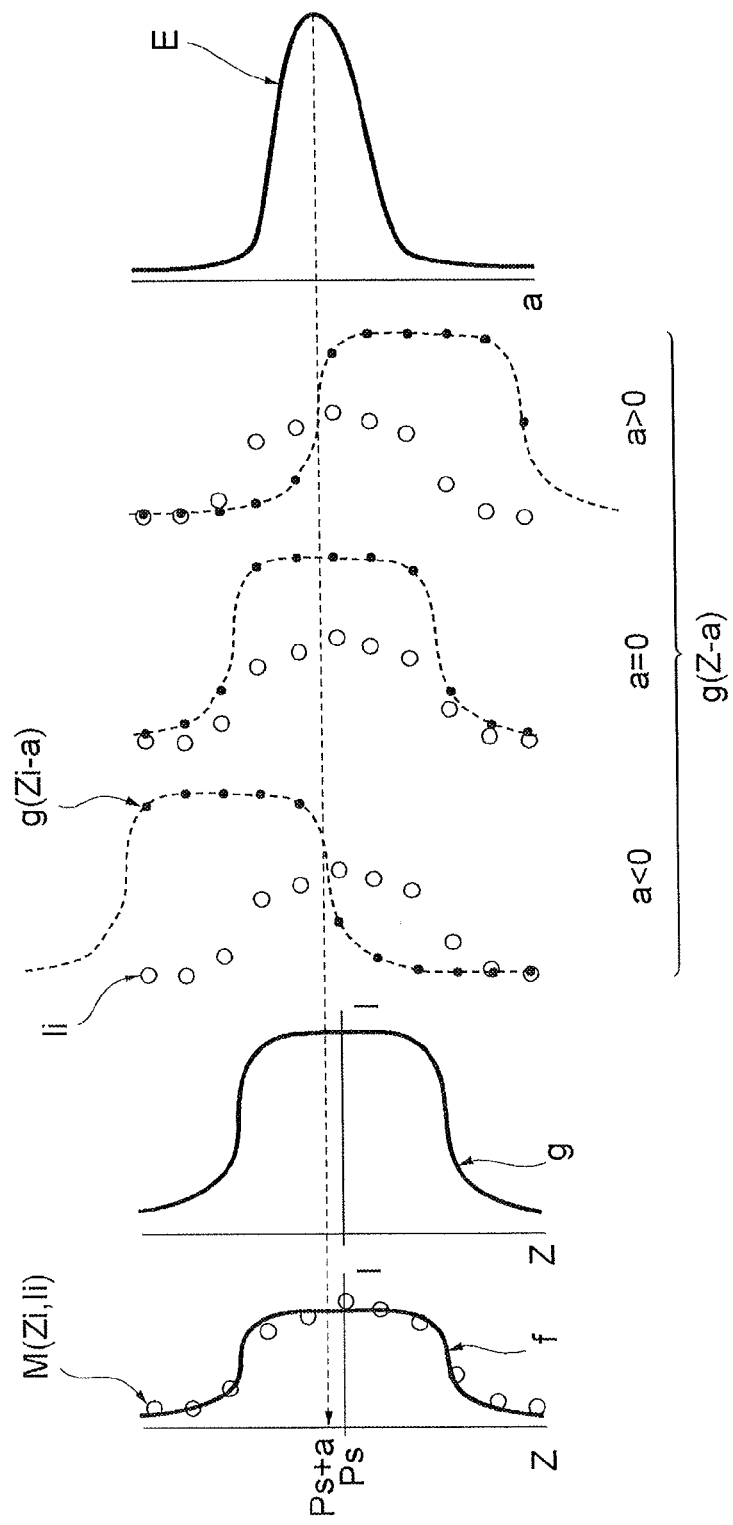

HEIGHT-MEASURING METHOD AND HEIGHT-MEASURING DEVICE

This is a continuation of PCT International Application No. PCT/JP2011/002560, filed on May 6, 2011, which is hereby incorporated by reference. This application also claims the benefit of Japanese Patent Application No. 2010-106870, filed in Japan on May 7, 2010, which is hereby incorporated by reference.

TECHNICAL FIELD

The present invention relates to a height-measuring method and to a height-measuring device.

TECHNICAL BACKGROUND

In order to measure the height of a surface of an object, it has been necessary in the prior art to supplement an optical system for obtaining an image of the surface of the object to be measured with an optical system for measuring height, e.g., a laser irradiation optical system, a confocal optical system, a white light interference optical system, a plurality of detectors of an electron microscope, or the like (for example, see Patent Document 1).

PRIOR ARTS LIST

Patent Document

Patent Document 1: Japanese Laid-open Patent Publication No. 2001-289621(A)

SUMMARY OF THE INVENTION

Problems to be Solved by the Invention

However, for the supplementary optical system(s) or device(s) as described above, the overall apparatus increases in complexity, and this causes an increase in price as well as an increase in the size of the apparatus, which is disadvantageous.

The present invention was contrived in view of the foregoing problems, it being an object thereof to provide a height-measuring method and a height-measuring device whereby height can be measured at high precision even when configured using a simple optical system involving a relative scanning system for the focal position and an image formation system.

Means to Solve the Problems

In order to resolve the foregoing problems, in a first aspect of the present invention, a height-measuring method comprising: causing an object to be measured, and an optical system for forming an image of the object to be measured on a first surface, to move in a relative fashion along an optical axis of the optical system; and measuring the relative height of the object to be measured on the basis of a change in brightness in the first surface, wherein the method further comprises: finding a correlation between a first property indicative of the change in brightness with respect to the relative movement, and based on a portion where the change in brightness with respect to the relative movement is large; and a second property indicative of the change in brightness with respect to the relative movement during the measuring of the object to be measured; and finding the relative height on the basis of the correlation.

It is also possible for the height-measuring method to comprise the step of: performing partial differentiation, using the relative movement, on a change in the correlation when the first property and the second property are moved in a relative fashion, to find the amount of relative movement at which the correlation reaches a maximum; and using the amount of relative movement as the relative height.

In a second aspect of the present invention, a height-measuring method comprises: causing an object to be measured, and an optical system for forming an image of the object to be measured on a first surface, to be moved in a relative fashion along an optical axis of the optical system; capturing an image of the first surface; and measuring the relative height of the object to be measured on the basis of the formed image, the method further comprising: repeatedly carrying out the relative movement and the image-capturing; and defining a second function on the basis of a first function fitted to a property comprising a position on the optical axis and a light intensity value of a pixel, as obtained for individual pixels of the resulting plurality of images; and using the position on the optical axis when a correlation value between the property obtained during measuring and the second function exhibits an extreme value to serve as the relative height of the object to be measured at a position corresponding to the pixel.

In the height-measuring method, it is also possible for the second function to be a function in which the absolute value of a first-order differential function of the first function, or the first-order differential function, is squared.

In the height-measuring method, it is also possible for the second function to be a function in which the first function has been multiplied by a constant.

It is also possible for the height-measuring method to comprise the step of: determining a desired shift amount at which a value of zero is obtained by performing partial differentiation, using the shift amount, on a correlation value between the second function having been moved in a relative fashion by the shift amount in the direction of the optical axis and the property obtained during measuring, to yield the relative height of the object to be measured at the position corresponding to the pixel.

A height-measuring device according to the present invention comprises: an optical system capable of forming an image of an object to be measured; a drive unit for moving the object to be measured and/or the optical system in a relative fashion along an optical axis of the optical system; a camera for capturing the image; and a controller for repeatedly carrying out the relative movement and the image-capturing and for performing the height measuring on the basis of the resulting plurality of results from capturing imaging.

In the height-measuring device, a configuration may be adopted in which the optical system is a microscope; and an objective lens of the microscope is moved in a relative fashion in the direction of the optical axis with respect to the object to be measured; and scanning is performed.

In the height-measuring device, a configuration may be adopted in which the microscope is a dark field optical microscope, a polarizing microscope, a fluorescence microscope, a differential interference microscope, a two-beam interference microscope, a stereomicroscope, or a zoom microscope, and in which a focal position movement mechanism, an image-capturing mechanism, and a control processor are incorporated into the microscope.

In the height-measuring device, a configuration may be adopted in which the microscope is constituted of a two-beam interference microscope; an object-use objective lens is moved in a relative fashion in the direction of the optical axis with respect to the object to be measured; and scanning is performed.

In the height-measuring device, a configuration may be adopted in which the microscope is constituted of a two-beam interference microscope, a reference light objective lens and a reference-light-forming mirror are jointly moved in the direction of the optical axis; and scanning is performed.

Advantageous Effects of the Invention

According to the height measuring system and the height-measuring device using the method as in the present invention, height can be measured at a high resolution and high precision even with a configuration using a simple optical system such as a relative scanning system for the focal position and an image-forming optical system.

BRIEF DESCRIPTION OF THE DRAWINGS

FIG. 3A illustrates a first method,
FIG. 3B illustrates a second method,
FIG. 3C illustrates a third method,
and FIG. 3D illustrates a fourth method;
FIG. 4A-4D illustrate a height-measuring method according to a present example, where
FIG. 4A illustrates a data point sequence and a first function,
FIG. 4B illustrates a second function,
FIG. 4C illustrates when the second function has been shifted,
and FIG. 4D illustrates a correlation value;
FIG. 8A illustrates a step for acquiring an image,
and FIG. 8B illustrates a procedure for storing images in respective image memories.

DESCRIPTION OF THE EMBODIMENTS

Figure 1:
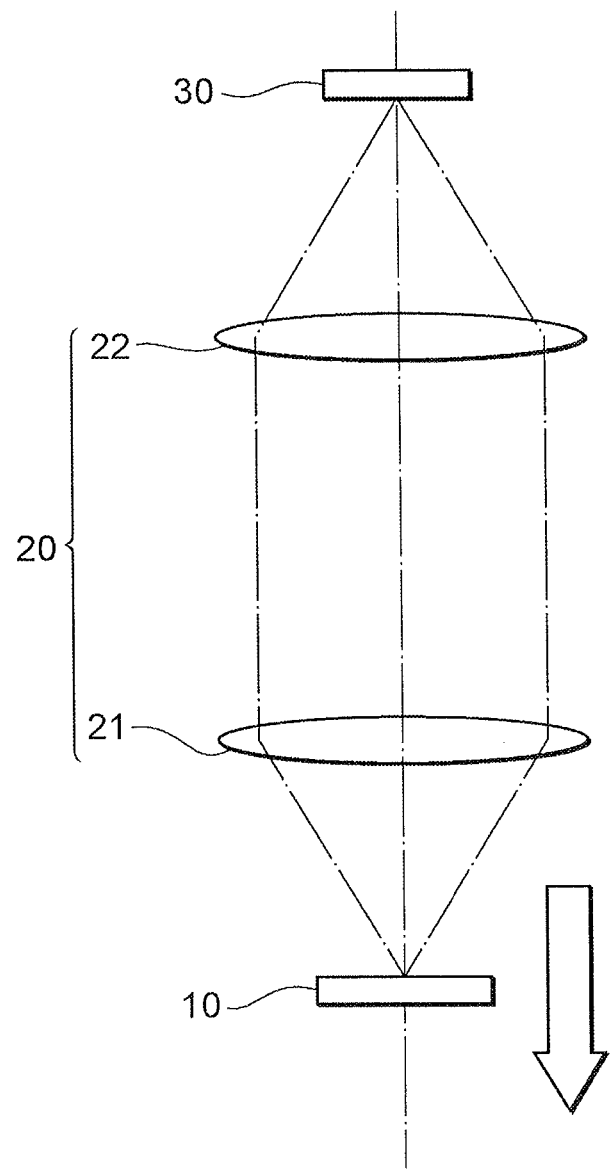
FIG. 1 illustrates a configuration of an imaging system of a height-measuring device.

The following is a detailed description of examples of the present invention, made with reference to the accompanying drawings. The description shall first relate to a height-measuring device according to the present example, with reference to FIG. 1. FIG. 1 is one example of a basic configuration of an imaging system of the height-measuring device, and includes an image-capturing element 30 as well as an image-forming optical system 20 comprising an objective lens 21 for collecting light from an object to be measured 10 and an image formation lens 22 for collecting the light emitted from the objective lens 21 and for forming, on the image-capturing element 30, an image of the object to be measured 10 which is on a focal plane of the objective lens 21. The image-capturing element 30 is disposed such that the imaging surface is positioned at the focal point position of the image formation lens 22, a configuration being adopted in which light from the surface of the object to be measured 10 is made into a parallel light flux by the objective lens 21 and caused to impinge on the image formation lens 22, and an image of the surface of the object to be measured 10 is formed on the imaging surface of the image-capturing element 30, the image then being captured by the image-capturing element 30. The relative position of the object to be measured 10 with respect to the objective lens 21 (the relative position of a stand supporting the object to be measured 10) can be moved and adjusted. For example, a piezoelectric drive mechanism can be used to adjust the vertical position of the objective lens 21; very minute and highly precise adjustments can be made to the relative position.

Figure 2:
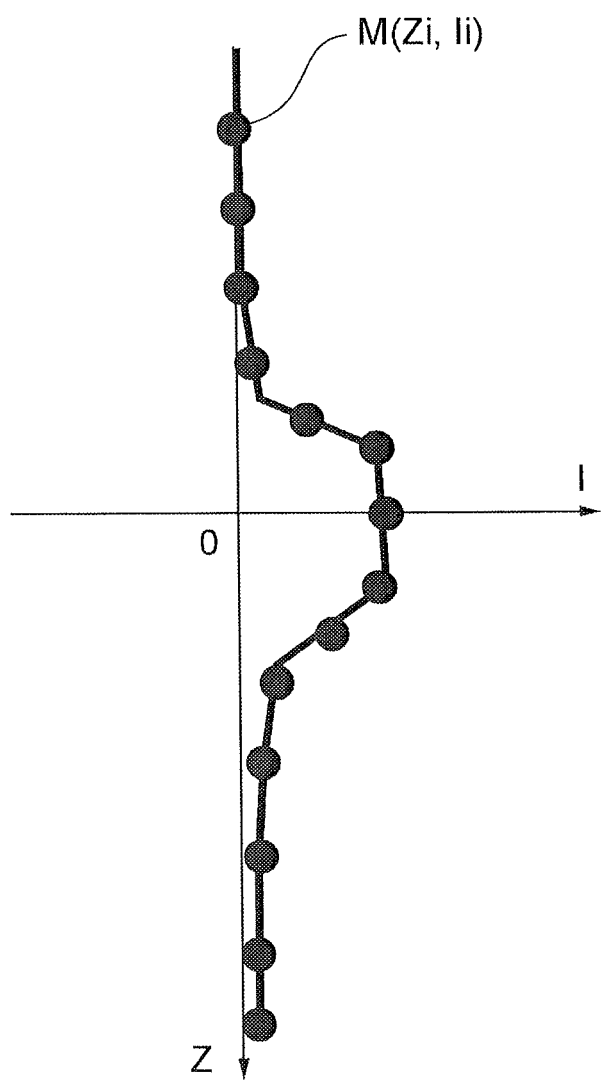
FIG. 2 illustrates a data point sequence acquired via the imaging system.

In a height-measuring device configured as described above, when the height of the object to be measured 10 is to be measured, the objective lens 21 is moved in a relative manner with respect to the object to be measured 10 along an optical axis of the image-forming optical system 20 (may be movement of the objective lens 21 by the piezoelectric drive mechanism, as described above, movement of the stand supporting the object to be measured 10, or movement combining both of these), whereby the focal position of the objective lens with respect to the object to be measured 10 is displaced in a relative manner; a plurality of concatenated images of the object to be measured 10 are acquired and stored by the image-capturing element 30, and the relative position on the optical axis when each of the images is acquired is stored in association with each image. In each of the plurality of images acquired in this manner, a data point sequence (numerical value sequence) M illustrated in FIG. 2 is obtained, where "I", which is a light intensity value of a given pixel (hereinafter called the "concentration") and "Z", which is the position on the optical axis of each image, are plotted onto a graph. Herein, the data point sequence M is represented as M(Zi, Ii), where i=1 to n. "i" is the sequence number of an image acquired in concatenation, as described above, and illustrates a case where "n" images have been acquired.

As is clear from FIG. 2, the concentration I of an image acquired via the image-forming optical system 20 described above reaches a maximum value when the focal plane of the objective lens 21 and the surface (measuring plane) of the object to be measured 10 are matched together. For this reason, in a conventional method, the height of the object to be measured 10 is measured by finding a function most closely fitted to the data point sequence M and finding the position on the optical axis at which the function (the concentration) reaches a maximum. For example, the method disclosed in Japanese Laid-open Patent Publication 2009-276269, which is a conventional technique, relates to a method in which a Fourier transform is used to determine a function most closely fitted to the data point sequence M, and height data is obtained on the basis of a phase term of the function. The method has an amplitude term and a phase term as regards of the degree of freedom when the function is fitted to the acquired data point sequence, and therefore a problem emerges in that there is a redundancy in the determination of the phase term, and the resolution of the height of the phase term is lowered.

In view whereof, the height-measuring method according to the present example, as shall be illustrated below, is configured such that a correlation value of the concentration with the data point sequence when a pre-established function (second function g) is moved along the optical axis with respect to the data point sequence M is found, and a height position of the object to be measured 10 is calculated on the basis of the position at which the correlation value reaches a peak. More specifically, the above-described height-measuring device is used, with a reference plate (a flat plate having a surface of uniform reflectance) disposed thereon instead of the object to be measured, to measure the data point sequence M as described above, and a first function f most closely fitted to the data point sequence M is found. Herein, the origin is defined as a position Zp on the optical axis at which the concentration I in the first function f reaches a maximum (exhibits a peak value). Next, a second function g for finding the height of the object to be measured 10 is found, and this second function g is used to measure the height at each position (corresponding to each pixel of the image-capturing element 30) on the surface of the actual object to be measured 10. More specifically, as shall be described below, a correlation value of the concentration with the data point sequence M when the second function g is moved along the optical axis with respect to the data point sequence M is found, and a height position of the object to be measured 10 is calculated on the basis of a position at which this correlation value reaches a peak.

The description shall therefore now relate to methods for finding the first function f and the second function g. Firstly, as described above, the data point sequence M is acquired, and a function most closely fitted to the acquired data point sequence M is found to serve as the first function f. At this time, the origin (Zp) of the Z axis illustrated in FIG. 2 serves as the value of Zi, which takes the maximum value of the concentration Ii found by sampling. The change in the concentration Ii in the data point sequence M in the neighborhood of the focal position, from the depth of focus of the image-forming optical system 20 and other relationships, becomes smaller, and thus the measurement accuracy is not particularly high in a case where the first function f is used directly to find the peak of the concentration Ii.

In view whereof, in the present method, the second function g for utilizing a portion in the data point sequence M where the change in the concentration is greater to find the position Z in the direction of the optical axis where the concentration I reaches a peak (or is displaced from a peak) is used to find the peak (or displacement from the peak) of the concentration I. More specifically, a functional form whereby the correlation value can be found with the portion where the change in concentration before and after the portion where the first function f reaches a peak is large is selected as the second function g. Specifically, the following method is used to create the second function g, on the basis of the first function f. Because the correlation is found in this manner at a portion where the change is large, the height position of the object to be measured 10 can be accurately found. A change property (profile) of the concentration (luminance) when the optical system and the object to be measured are moved in a relative fashion along the optical axis is a property determined by the optical system and therefore the first function f, too, can be determined so as to correspond to the optical system. The description below shall relate to several examples of methods for creating the second function g on the basis of the first function f.

Figure 3A:
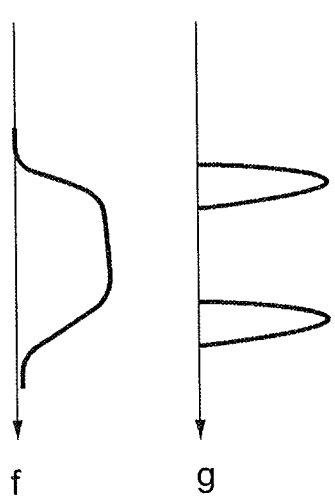
FIG. 3A-3D illustrate methods for determining a second function, where

A first method for creating the second function g shall now be described with reference to FIG. 3A. The left side of FIG. 3A illustrates the first function f most closely fitted to the data point sequence M illustrated in FIG. 2 and whereby the position where the concentration Ii reaches a maximum is the origin (Zp). The second function g illustration on the right side of FIG. 3A is a representation of the result obtained by squaring the first-order differential of the first function f, or taking the absolute value of the first-order differential of the first function f. In a case where, for example, the first function f has the shape illustrated in FIG. 2, the second function g will take a shape whereby two portions reaching a peak are formed, in respective correspondence with the portion where the value of Y increases and the portion where the value of Y decreases in the first function f. The middle (center) of the two portions reaching a peak in the second function g will be the origin (Zp). The origin (Zp) need not necessarily be the middle (center) of the peak portions.

Figure 3B:
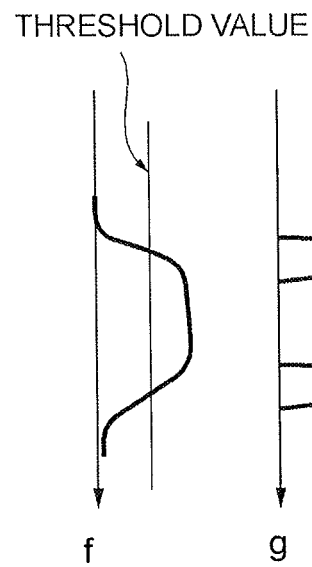

A second method for creating the second function g shall now be described with reference to FIG. 3B. In this method, in a case where a first-order differential of the first function f illustrated on the left side of FIG. 3B monotonically decreases or increases, the first-order differential reaches a peak in the neighborhood of the start of the increase or the end of the decrease. In such a case, when the portion where the first-order differential reaches a peak is used in the manner described above to create the second function g, a correlation will be found with sample data that has a small concentration, and an error will be caused. For this reason, a function which will reach a maximum or a minimum at two points where the first function f is equal to a pre-established threshold value will serve as the second function g. In such a case, too, the second function g takes a shape analogous to that of the first method. A second function g having a peak in any two locations capable of sandwiching the peak (focus position) of the first function f, irrespective of the threshold value, can also be used.

Figure 3C:
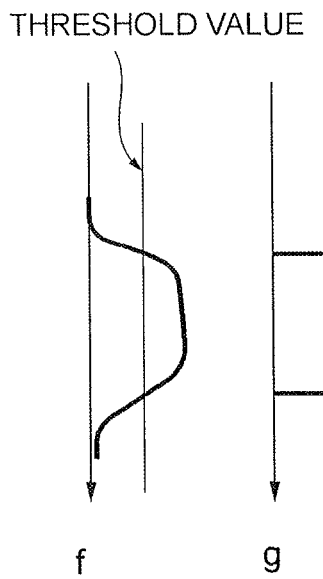

A third method for creating the second function g shall now be described with reference to FIG. 3C. In this method, in a case where the first-order differential of the first function f illustrated on the left side of FIG. 3C decreases monotonically or increases monotonically, a function which is 1 between the two points where the first function f is equal to a pre-established threshold value and elsewhere is 0 serves as the second function g. In such a case, the second function g will be a stepped function.

Figure 3D:
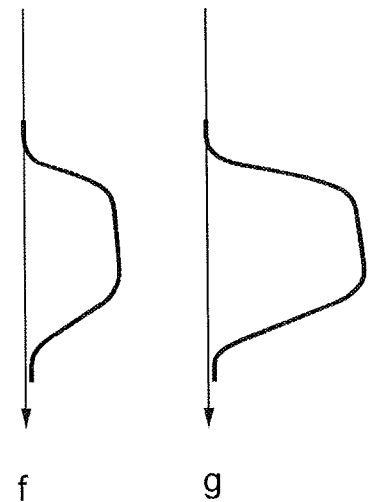

A fourth method for creating the second function g shall now be described with reference to FIG. 3D. In this method, the first function f illustrated on the left side of FIG. 3D is multiplied by a constant to serve as the second function g. In a case where the constant is 1, the first function f and the second function g will be the same. In the foregoing description, the second function g was found from the results (data point sequence) from when the reference plate was used to take measurements, but it would also be possible to use the object to be measured 10 to take measurements in advance and find the second function g from the measurement result therefrom. It would be further possible to use a second function g having a peak in any two locations capable of sandwiching the peak (focus position) of the first function f, without being based on the measurement result.

In the following description, a case where the second function g is determined by the fourth method and is used to take height measurements, as illustrated in FIG. 4B, shall now be described. More specifically, the description shall relate to a case where, as illustrated in FIG. 4A, the first function most closely fitted to the measurement values (data point sequence M) of the reference plate as calculated via the image-forming optical system 20 is multiplied by a constant to determine the second function g as is illustrated in FIG. 4B, and the second function is used to take height measurements.

First, the height-measuring device is used to move the objective lens 21 in a relative manner with respect to the object to be measured 10, and the focal position of the objective lens with respect to the object to be measured 10 is displaced in a relative manner; a plurality of concatenated images ("n" images) of the object to be measured 10 are acquired and stored by the image-capturing element 30, and the images are stored in association with the relative position $Z_i$ (i=1 to n) on the optical axis. In the plurality of images acquired in this manner, the concentration (light intensity value) of a pixel corresponding to a predetermined position $(X_i, Y_i)$ on the surface of the object to be measured 10 illustrates the change occurring to the height position $Z_i$, as the data point sequence $M(Z_i, I_i)$ illustrated by the small point marked with a "○" in FIG. 4A.

Figure 5:
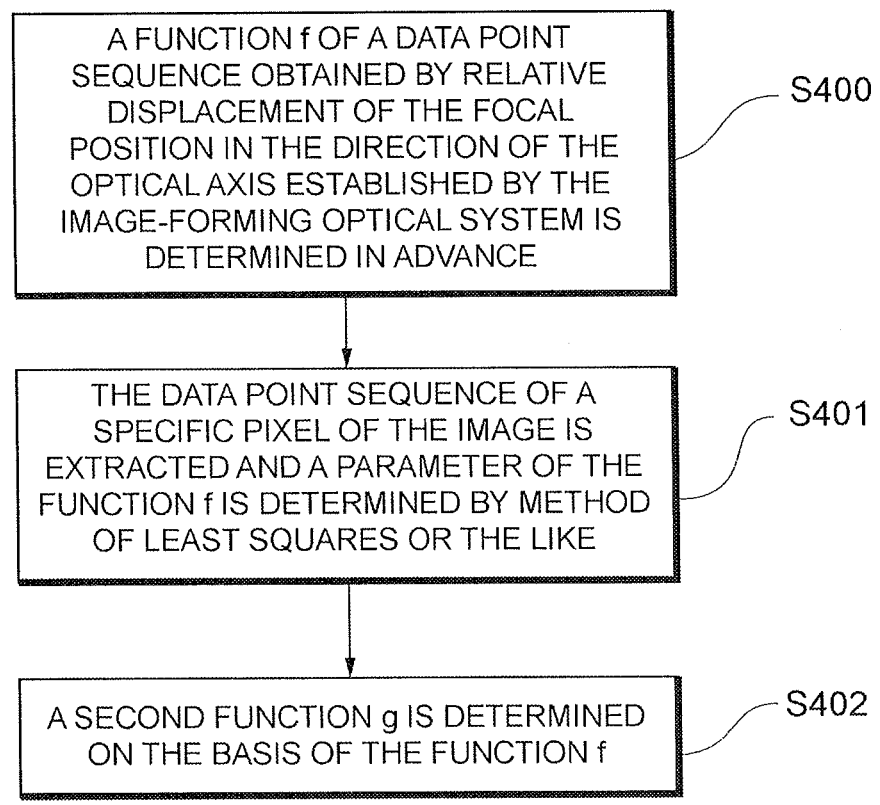
FIG. 5 is a block diagram illustrating a procedure for determining the second function.

Before the height of the object to be measured 10 is measured, the second function g is determined in advance by a procedure illustrated in FIG. 5. In terms of this procedure, first, a function most closely fitted to the data point sequence M (this is the first function f, the function illustrated in FIG. 4A with the solid line) is determined in advance from the data measured using the reference plate (step S400). Then, the data point sequence M of a specific pixel is extracted from the plurality of images acquired by the image-capturing element, via the image-forming optical system 20, while the relative positions of the objective lens 21 and the object to be measured 10 are being changed, to determine a parameter of the first function f by the method of least squares or the like (step S401). The second function g is determined by the fourth method described above, on the basis of the first function f determined in this manner (step S402). This second function g is illustrated in FIG. 4B.

Next, as illustrated in FIG. 4C, the second function g is shifted within a predetermined range in the direction of the optical axis (the direction of the Z-axis), and a correlation value E between the concentration $I_i$ at each measurement point $Z_i$ and the value of the second function g at the relevant measurement point $Z_i$. This correlation value E is represented as in the following equation (1). Herein, a indicates the amount by which the second function g is shifted in the direction of the Z-axis.

$$E = \Sigma(I_i \cdot g(Z_i - a)) \quad (1)$$

When, as illustrated in FIG. 4C, a shift amount a is moved from being negative to being positive and the correlation value E between the concentration $I_i$ and the second function $g(Z_i-a)$ is found, a greater absolute value of the shift amount a corresponds to a lesser correlation value, as illustrated in FIG. 4D; the correlation value reaches a peak in the neighborhood where the shift amount a is 0. In order to find the peak value (maximum value) of the correlation value E represented by equation (1), the equation (1) is partially differentiated by the shift amount a, as illustrated in the following equation (2), and the shift amount a when the partially differentiated value reaches 0 is found.

$$\partial E/\partial a = 0 \quad (2)$$

Possible methods for finding the shift amount a that satisfies this equation (2) include analytically determining the amount, Newton's method, successive iteration, or a similar numerical value computation technique. When the value of the shift amount a where the correlation value E, found from the concentration $I_i$ and the second function $g(Z_i-a)$, reaches a peak is found from equation (2) for every height position $Z_i$ in this manner, and where Ps is the value on the Z-axis of the measurement point serving as the origin, then Ps+a is the relative height value of the object to be measured 10 at a position corresponding to the relevant pixel. If the difference in height between two locations is to be found, it will be the difference in the shift amounts a where the correlation value E reaches a peak in the two locations. The description above relates to a case where the second function g is shifted in the direction of the optical axis with respect to the data point sequence M to find the correlation value, but it would also be possible to adopt a configuration in which the second function g is fixed and the data point sequence M is shifted in the direction of the optical axis to find the correlation value.

EXAMPLES

Example 1

Figure 6:
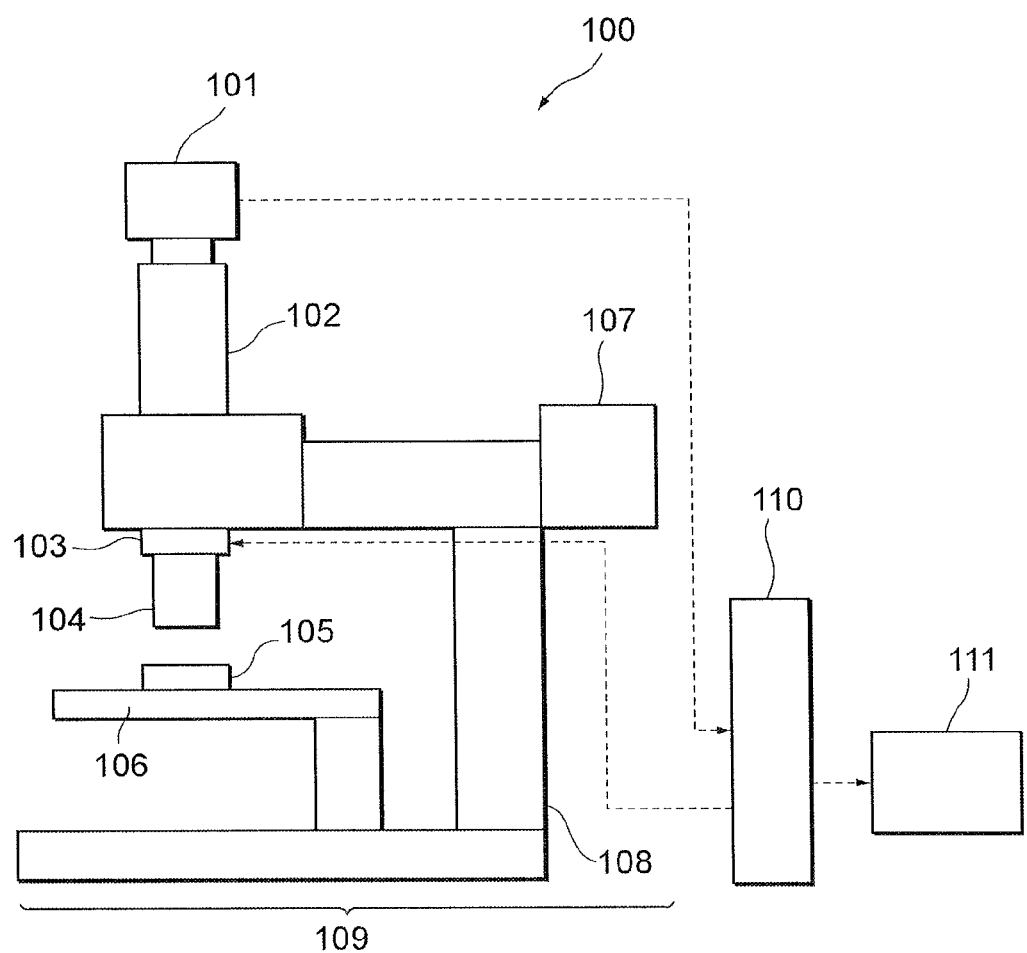
FIG. 6 illustrates a configuration of a height-measuring device using a microscope.

Example 1 is described as a case where the above-described height-measuring method is applied to a height-measuring device using a microscope device, with reference being made to FIG. 6. This height-measuring device 100 comprises: an imaging device 109 for acquiring an image of the upper surface of an object 105 to be measured at each of a plurality of height positions; a control processor 110 for controlling the operation of the imaging device 109 and for calculating a relative height value of the object 105 to be measured from the acquired images; and a display device 111 for displaying a processing result from the control processor 110.

The imaging device 109 comprises: an imaging camera 101 having a built-in image-capturing element; a microscope barrel device 102 having a built-in optical system (image formation lens); a microscope objective lens 104; a piezoelectric drive device 103 for driving the microscope objective lens 104 up or down and piezoelectrically scanning up-down relative positions with respect to the object 105 to be measured, the piezoelectric drive device having a piezoelectric element; a microscope sample stage 106 atop which the object 105 to be measured is to be placed; a microscope illumination device 107 accommodating a light source for emitting a white light and illuminating the object 105 to be measured; and a microscope base 108 for supporting the microscope barrel device 102 and the microscope illumination device 107.

Figure 7:
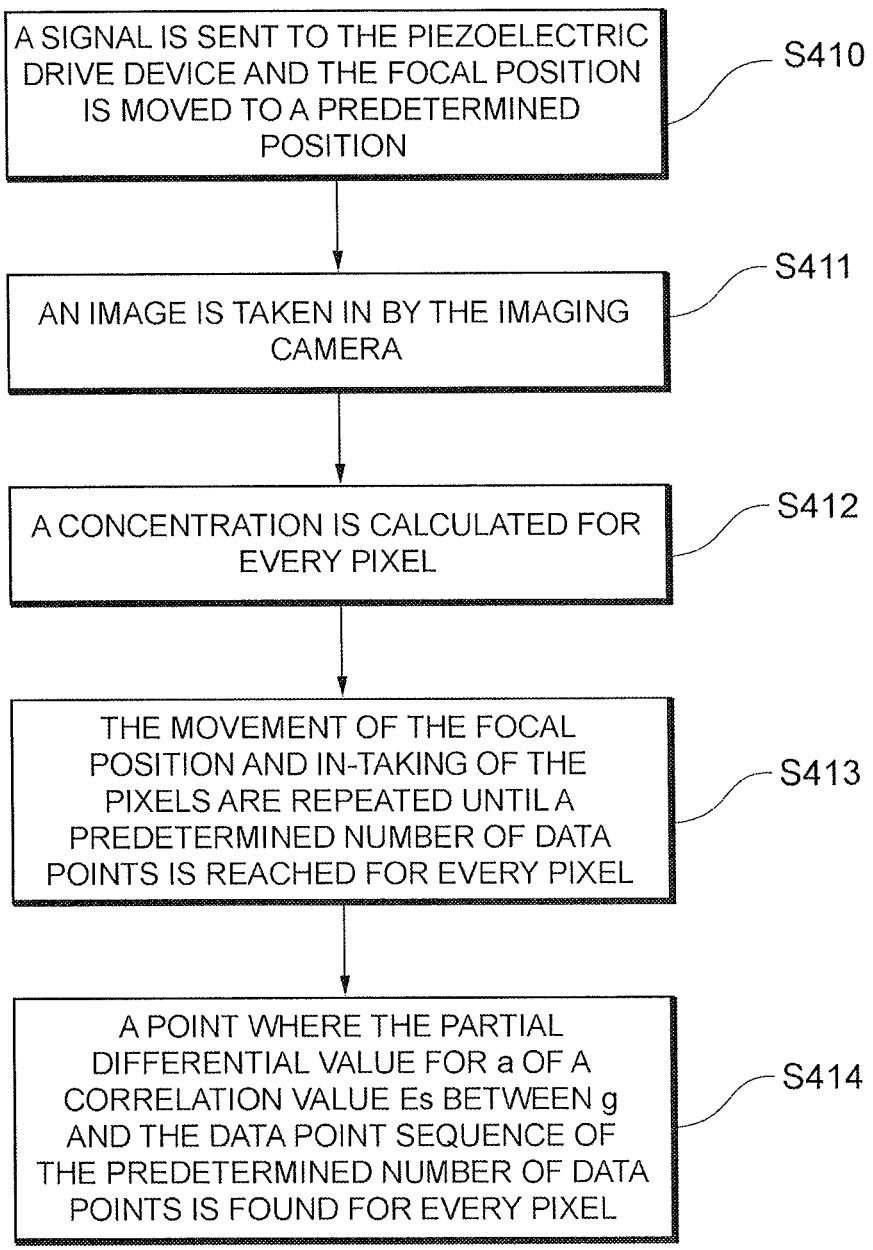
FIG. 7 is a block diagram illustrating a procedure for determining a maximum coordinate value for the correlation value.

A description shall now be given in regard to a height measurement of the upper surface of the object to be measured 10 using the height-measuring device 100. Firstly, as illustrated in FIG. 7, within the height-measuring device 100, a signal is sent to the piezoelectric drive device 103 by the control processor 110, and the focal position of the microscope objective lens 104 is moved to a predetermined position (step S410). The object 105 to be measured, having been placed atop the microscope sample stage 106, is irradiated with light irradiated from the microscope illumination device 107. The light reflected by the surface of the object 105 to be measured passes through the microscope objective lens 104 and the microscope barrel device 102 (through the image formation lens) and is collected on an imaging surface of the imaging camera 101, and thus an image of the object 105 to be measured is captured by the imaging camera 101. The digital image acquired from the imaging camera 101 in this manner is sent to the control processor 110 (step S411).

The control processor 110 either stores the concentration of the pixels of the acquired image, or calculates a numerical value derived from the concentration by a process to be described below (a correction value or local focus degree for each of the pixels) (step S412). Then, the piezoelectric drive device 103 is controlled and the movement of the focal position and in-taking of the image is repeated until a predetermined number of data points is reached for every pixel (step S413). Furthermore, the value of the shift amount a between sampling points where the partial differential of the correlation value E reaches 0 is found by an analytical or numerical value computation technique, centered on the sampling points where the correlation value E reaches a maximum, and the value thereof is saved (step 413).

In the above-described step 412, a numerical value whereby the concentration has been processed is calculated; this is because, in some cases, processing to correct the concentration on the basis of the concentrations of the pixels in the periphery of each pixel is able to achieve a greater degree of precision in the calculation of the correlation value E than when the concentration of each pixel of the acquired image is used without alteration. In view whereof, the description shall now relate to a method for calculating the correction value (local focus degree) for every pixel in step S412, with reference to FIGS. 8 and 9.

Figure 8A:
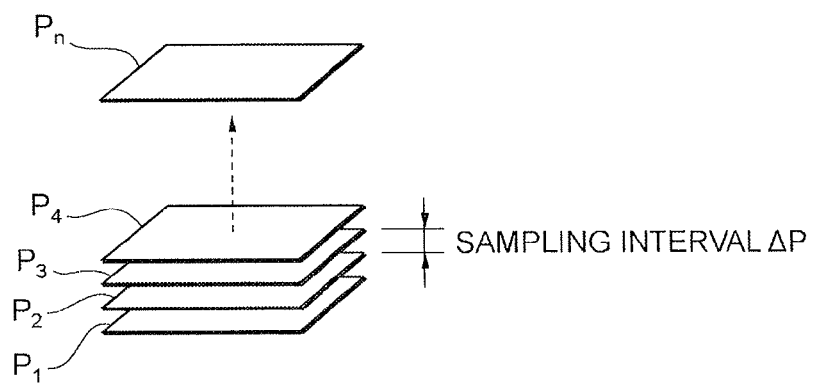
FIG. 8A-8B illustrate a method for acquiring images, where
Figure 8B:
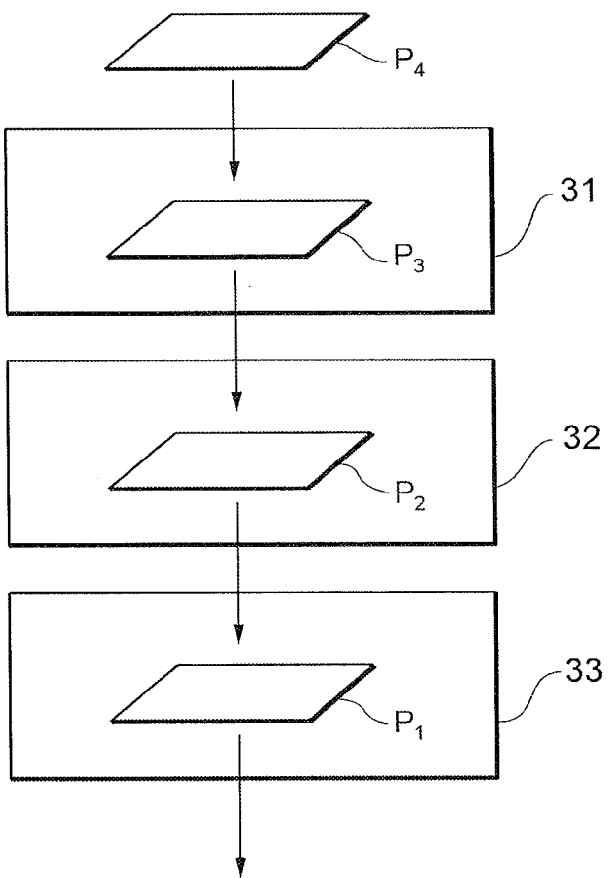

As described above, the control processor 110 stores the imaging images inputted in sequence from the imaging camera 101 in an image memory provided to the control processor 110, in units of a single image; also, the stored images are continuously updated whenever the next image is acquired. Herein, the control processor 110 is assumed to be provided with three digital image memories 31-33. For example, as illustrated in FIG. 8A, firstly, when a first (initial) image P1 is acquired in a step for acquiring images P1, P2, P3, ... Pn in sequence, one by one, at a predetermined sampling interval ΔP, then the image P1 is stored in the first digital image memory 31. Then, when the next (second) image P2 is acquired, the image P1 is transferred to the second digital image memory 32 and stored there, and in turn the image P2 is stored in the first digital image memory 31. Next, when the third image P3 is acquired, the image P1 is transferred to the third digital image memory 33 and the image P2 is transferred to the second digital image memory 32, in succession; in turn, the inputted image P3 is stored in the first digital image memory 31 (see FIG. 8B). When the fourth image P4 is acquired, the image P4 is transferred to and stored in the first digital image memory 31, the image P3 is transferred to and stored in the second digital image memory 32, and the image P2 is transferred to and stored in the third digital image memory 33, in succession; the initially acquired image P1 is deleted from the digital image memories 31-33.

When the images are so acquired in succession, the inputted images are continuously updated and consecutively stored in the first digital image memory 31, the second digital image memory 32, and the third digital image memory 33, in the stated order. Accordingly, every time the images are inputted one by one in succession, a state is adopted in which each of the image memories 31-33 has stored, one by one, the images acquired with mutual displacement by the sampling interval ΔP in the up-down direction.

At this time, the control processor 110 executes the following operation every time an image is acquired. Firstly, a pixel for acquiring the local focus degree (described later) is set. Hereinbelow, the pixel for acquiring the local focus degree shall be described as a "pixel of interest." Next, target pixels which are actuated by digital operators (differential operators) OP10, OP20, OP30 are specified from pixels in the image data stored in the digital image memories 31, 32, 33, on the basis of the position of the set pixel. The values of the pixels actuated by the digital operators OP10, OP20, OP30 are multiplied by a coefficient from the digital operators, to acquire the local focus degree with a predetermined computational equation.

In this manner, candidate values for the local focus degree are acquired continuously from three sets of image data sampled in sequence, and the local focus degree is acquired. The local focus degree (LFS) is thus found in pixel units. More specifically, all of the pixels, excluding the pixels on the outermost periphery in an image stored in the second digital image memory 32, are targets for the calculation of the local focus degree.

Figure 9:
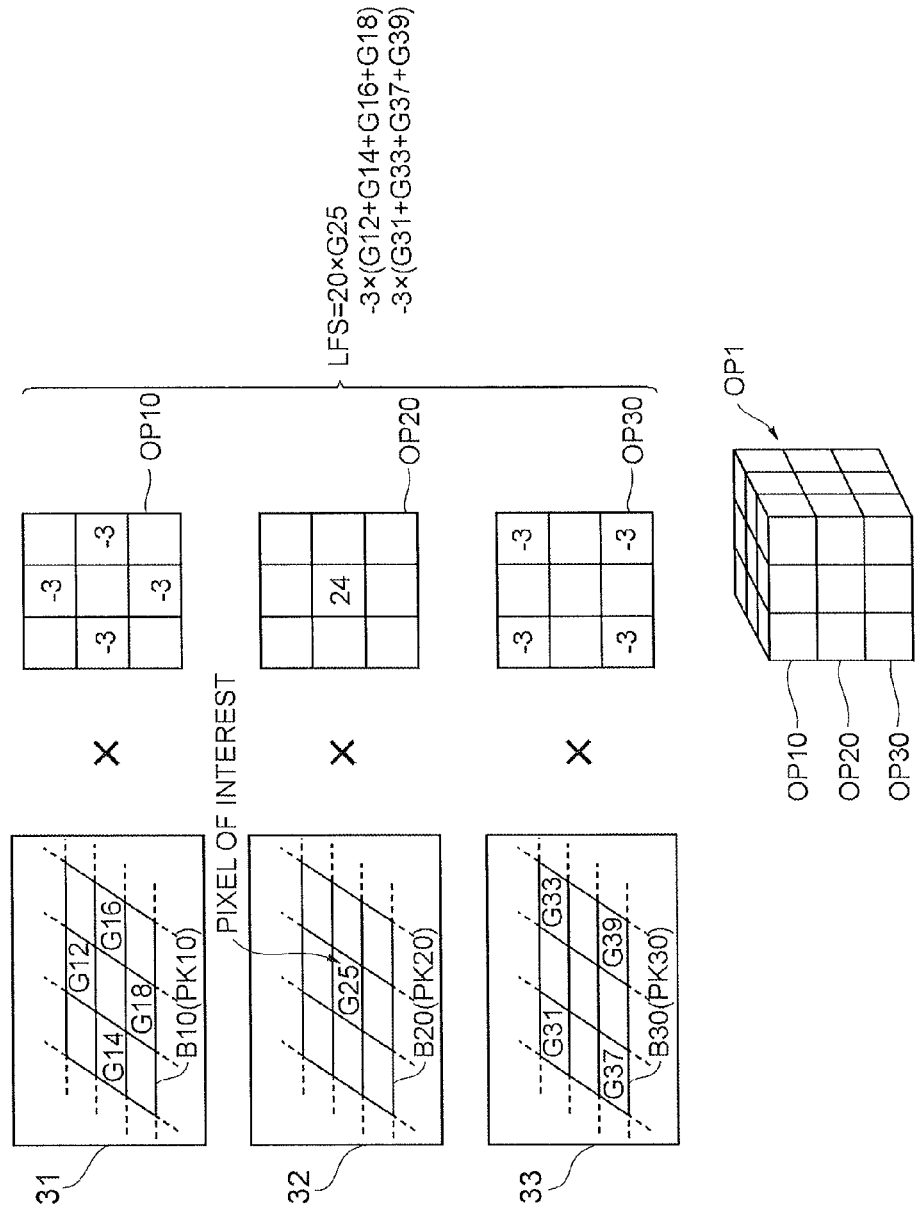
FIG. 9 illustrates a convolution operation by a digital operator.

Herein, in the process for acquiring the images P1, P2, P3, ..., Pn in sequence at the sampling interval ΔP, in a case where Pk10, Pk20, Pk30 are any desired images stored in the digital image memories 31, 32, 33, respectively, as illustrated in FIG. 9, then the local focus degree is calculated for every pixel (pixel of interest) within the image Pk20 stored in the second digital image memory 32. The calculation of the local focus degree, as illustrated in FIG. 9, is carried out by extracting: a pixel block B20 of 3×3 pixels, centered on the pixel of interest (pixel value G25) in the image Pk20 stored in the second digital image memory 32; a pixel block B10 of 3×3 pixels, in which the pixel positions correspond to those of the pixel block B20, in the image Pk10 stored in the first digital image memory 31; and a pixel block B30 of 3×3 pixels, in which the pixel positions correspond to those of the pixel block B20, in the image Pk30 stored in the third digital image memory 31; and running a convolution operation (product-sum operation) between the pixel blocks B10, B20, B30 and the respectively corresponding digital operators OP10, OP20, OP30.

Herein, in the pixel block B10, the pixel of interest (pixel value G25) will be the operand (a reference); in the pixel block B30, among the 3×3 pixels, those pixels positioned at the four corners (pixel values G31, G33, G37, G39) will be the operands; and in the pixel block B10, among the 3×3 pixels, those pixels positioned in a cross shape (pixel values G12, G14, G16, G18) will be the operands. For the digital operators OP10-30, the weighting of the coefficient for the pixel of interest (G25) is 24, and the weighting for the pixels in the periphery thereof (G31, G33, ..., G12, G14, ...) is set to −3 for each. The local focus degree LFS of the pixel of interest is found, as illustrated by equation (3) below, by a convolution operation using the digital operators OP10-30 for the nine pixel values of these operands.

$$LFS = 24 \times G25 + \{-3 \times (G12+G14+G16+G18)\} + \{-3 \times (G31+G33+G37+G39)\} \quad (3)$$

The height-measuring device 100 according to example 1 is configured such that, in the above-described step 412, the local focus degree LFS is used as a corrected concentration to carry out the processing described above.

Figure 10:
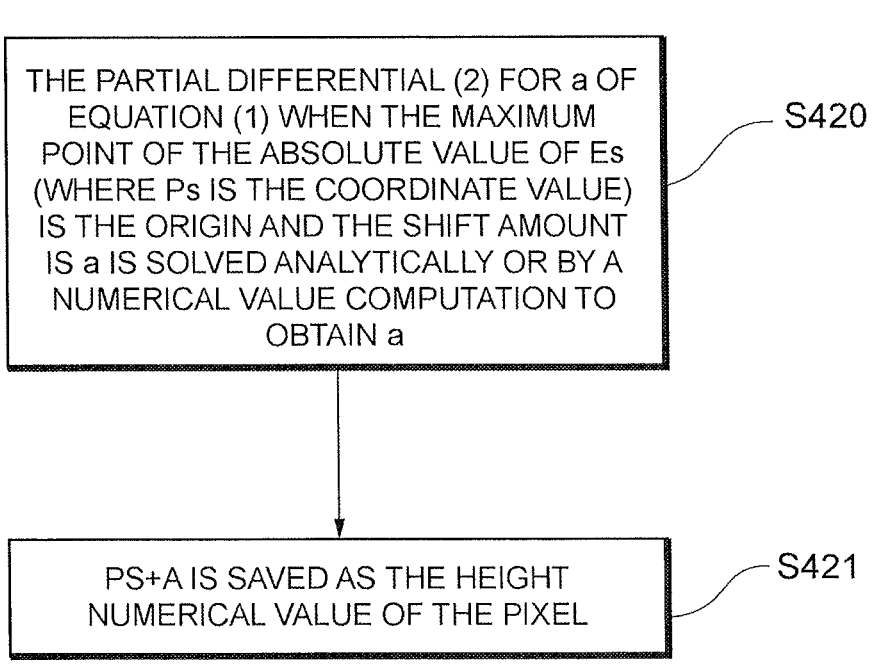
FIG. 10 is a block diagram illustrating a procedure for determining a final height.

Thereafter, as illustrated in FIG. 10, the maximum point of the absolute value of the correlation value E of every pixel as measured and calculated in the foregoing manner (where "Ps" is a coordinate value) is used to solve for equation (1) and (2) using a method for finding same analytically, Newton's method, successive iteration, or a similar numerical value computation technique, thus obtaining the value of the shift amount a for every pixel (step 420). The Ps+a (or a) calculated for every pixel is then saved as the relative height value of that pixel (step S421).

The height-measuring method according to the present example can be implemented by incorporating the focal position movement mechanism, the image-capturing mechanism, and the control processor into all types of microscopes, including a dark field optical microscope, a polarizing microscope, a fluorescence microscope, a differential interference microscope, a two-beam interference microscope, a stereomicroscope, or a zoom microscope.

The height resolution in this example 1 will be a value for which an appropriate second function g is selected and the sampling interval ΔP in the direction of the optical axis is thereby divided by m, independent of the depth of focus. Herein, m is determined from two-axis blurring when the sample (object) is moved with respect to the objective lens, error of the image-capturing element, error during computation when the shift amount a is obtained, or the like. In the case of example 1, d=10 nm, m=10000, and the height resolution is 0.001 nm.

As described above, in the method for using a Fourier transform, which is a conventional technique, the degree of freedom fitted to the acquired data point sequence has an amplitude term and a phase term; accordingly, there is redundancy in determining the phase term, and the height resolution of the phase term is about 0.1 nm. However, in the present scheme, all besides the phase term of the second function g is fixed, and the phase term where the correlation value reaches a peak is found; therefore, a much higher resolution (0.001 nm, as described above) than that of the conventional method is achieved. Furthermore, a conventional high-resolution height-measuring device will use a method which is dependent on the width of a signal, in the direction of the optical axis, in the vicinity of the focal point, and therefore it is necessary to use a white light interferometer; however, the use of the present scheme makes it possible to achieve a resolution of about one ten-thousandth of the sampling interval ΔP when the second function g is appropriately selected, even when a bright-field microscope having a depth of focus of about 3 μm is used.

Example 2

In example 1 described above, the description related to a case where the height-measuring method according to the present example was applied to a height-measuring device using a microscope; however, it would also be possible to apply the height-measuring method to a height-measuring device using a scanning electron microscope (SEM). In such a case as well, the procedure of processing thereof is similar with respect to example 1.

As described above, when the height-measuring method according to the present example is used, selecting an appropriate second function g brings the height resolution to a value obtained by dividing the sample interval ΔP in the direction of the optical axis by m, independent of the depth of focus. The depth of focus of a scanning electronic microscope is about 8 μm at 10,000× magnification. The scanning range must be at least three times the depth of focus; therefore, because the number of acquired images increases and more time is required when the sampling interval ΔP is reduced, no practical advantage for use as a height-measuring device is obtained. For this reason, in a case where a scanning electron microscope is used when, for example, the sampling interval ΔP is 100 nm, then m can be set to 10,000, and thus the height resolution becomes 0.01 nm.

A height-measuring device using a conventional SEM will have a method in which two or more detectors are used to find a slope from the slope established in advance from the difference in the output signals thereof and also a calibration curve of the output difference; the slope thus found is then integrated to find the height. With this method, the height resolution is about 3 nm. Yet, according to the present scheme, it is possible to achieve a height resolution of 0.01 nm, as described above, and moreover it is possible to use an ordinary SEM without alteration, and thus possible to configure at low cost.

Example 3

The height-measuring method according to the present example can also be applied to a height-measuring device using a camera equipped with a macro lens. A height-measuring device using a camera equipped with a macro lens refers to an image-capturing camera equipped with a macro lens, the image-capturing camera being mounted on a stage and moved in a relative fashion with respect to the surface of an object to be measured via the stage to thereby acquire images, the images being used to measure height. The method for measuring height is similar with respect to example 1.

In the case where such a camera equipped with a macro lens is used, the resolution in the prior art is about 8 μm. However, in the present scheme the resolution is 10 nm when the depth of field of the macro lens is 1 mm and the sampling interval ΔP is 0.1 mm. For this reason, it is possible to achieve a high-resolution device at low cost for every stage.

Example 4

Figure 11:
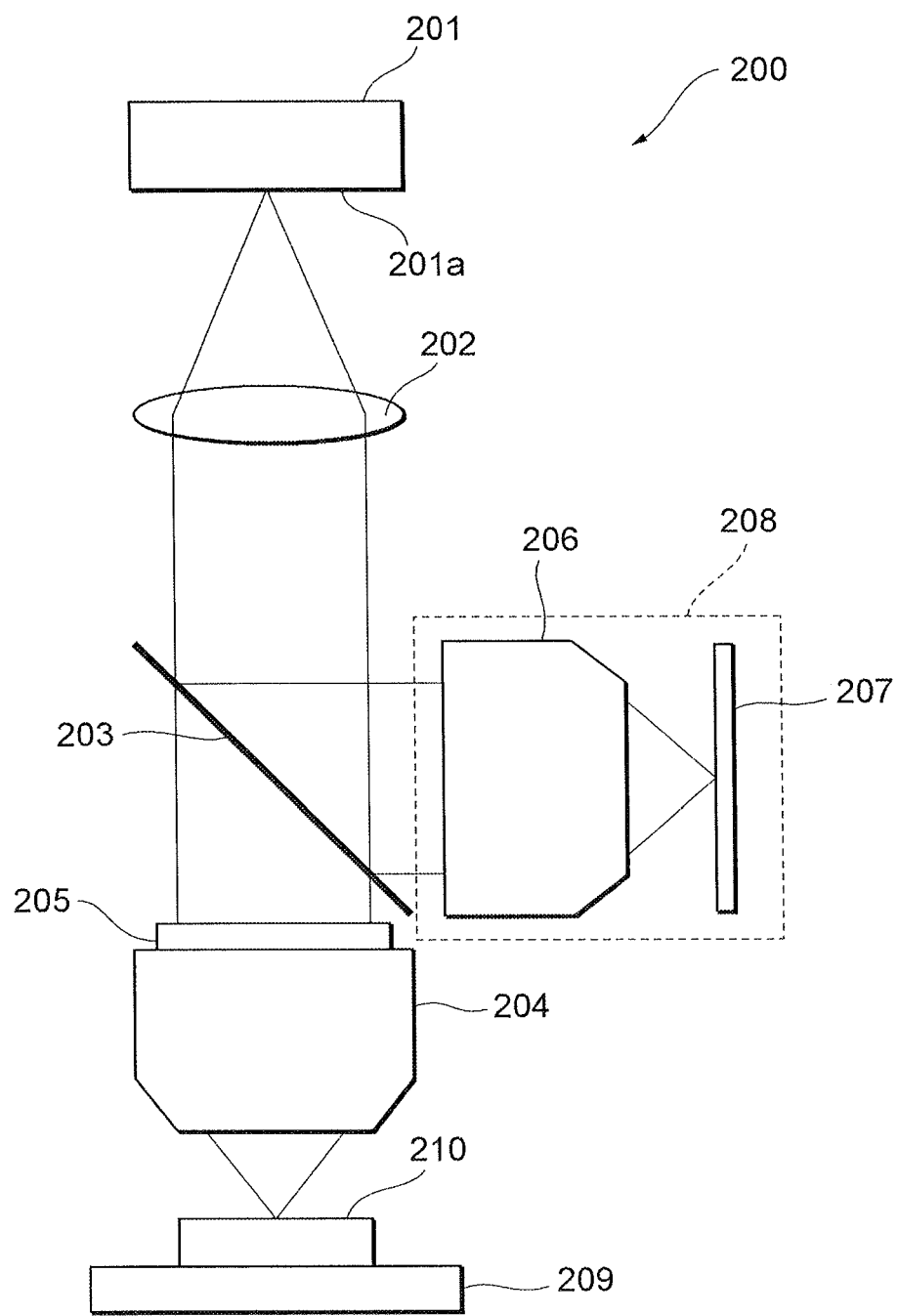
FIG. 11 is a schematic configuration diagram illustrating a height-measuring device using a two-beam interference microscope.

The method according to the present example could also be applied to a height-measuring device configured using a two-beam interference microscope. FIG. 11 illustrates an example of a configuration of a height-measuring device 200 using a two-beam interference microscope, configured as follows. This device 200 has a two-beam interference microscope as the basic configuration, and comprises an image-capturing element 201, an image formation lens 202, a half mirror 203, an object-use objective lens 204, a reference light objective lens 206, a reference-light-forming mirror 207, and a loading stage 209 atop which an object 210 to be measured is to be placed. An imaging surface 201a of the image-capturing element 201 is disposed at the focal position of the image formation lens 202, and the object-use objective lens 204 and the reference light objective lens 206 are lens of the same focal length and of the same configuration (having the same optical performance); the reference-light-forming mirror 207 is disposed at the focal position of the reference light objective lens 206.

Although not depicted, an illumination device whereby illumination light (a parallel light flux) is incident on an optical path between the image formation lens 202 and the object-use objective lens 204 is provided, and some of the illumination light incident in this manner passes through the half mirror 203 and is collected by the object-use objective lens 204 to irradiate the upper surface of the object 210 to be measured having been placed atop the loading stage 209. The remainder of the illumination light is reflected on the half mirror 203 and is incident on the reference light objective lens 206 and collected thereon to irradiate the reference-light-forming mirror 207. The light with which the upper surface of the object 210 to be measured is irradiated, being reflected thereon, is incident on the object-use objective lens 204 and forms a parallel light flux, which passes through the half mirror 203, is collected by the image formation lens 202, and forms an image of the upper surface of the object 210 to be measured on the imaging surface 201a of the image-capturing element 201. Meanwhile, the light with which the reference-light-forming mirror 207 is irradiated is entirely reflected thereon and returns to the reference light objective lens 206 to become a parallel light flux, which is partially reflected by the half mirror 203, is connected by the image formation lens 202, and forms an image of the surface of the reference-light-forming mirror 207 on the imaging surface 201a of the image-capturing element 201.

It is possible to adjust the height position of the loading stage 209 (the height position in the direction of the optical axis) in the device 200 configured in this manner, and when the upper surface of the object 210 to be measured having been placed atop the loading stage 209 is positioned at the focal position of the object-use objective lens 204 by such position adjustment, then the optical path length from the imaging surface 201a of the image-capturing element 201 to the upper surface of the object 210 to be measured and the optical path length from the imaging surface 201a of the image-capturing element 201 to the reference-light-forming mirror 207 become equal. From the imaging surface 201a to the half mirror 203 is a shared optical path, and thus the optical path length from the half mirror 203 to the position to be measured on the object 210 to be measured (a measurement optical path length) and the optical path length from the half mirror 203 to the reference-light-forming mirror 207 (a reference optical path) will be equal. However, although the surface of the reference-light-forming mirror 207 herein is smooth, differences in the two optical path lengths may happen depending on irregularities in the surface of the object 210 to be measured, and optical interference may occur, but in a case where white light is used, only a portion where the measurement optical path length and the reference optical path length are matched exactly will be imaged brightly.

The height-measuring device 200 in the present example employs a two-beam interference microscope configuration, as described above, and could also adopt a configuration provided with a piezoelectric drive device 205 for high-precision adjustment of the position of the object-use objective lens 204 in the direction of the optical axis, the piezoelectric drive device comprising a piezoelectric element. The object-use objective lens 204 is moved in the direction of the optical axis by the piezoelectric drive device 205, a plurality of interference images are acquired by the image-capturing element 201, and this plurality of interference images is used to measure the height of the upper surface of the object 210 to be measured. The method for measuring height herein is similar with respect to example 1. Instead of both the object-use objective lens 204 and the object 210 to be measured being moved in a relative fashion in the direction of the optical axis, there can also be adopted a configuration in which the reference light objective lens 206 and the reference-light-forming mirror 207 are moved in a relative fashion in the direction of the optical axis.

In the height-measuring device 200 using the two-beam interference microscope according to this example, instead of the piezoelectric drive device 205 for moving the object-use objective lens 204 in the direction of the optical axis (or, alternatively, in combination therewith), it would also be possible to adopt a configuration in which a second piezoelectric drive device 208 for moving both the reference light objective lens 206 and the reference-light-forming mirror 207 are moved jointly in the direction of the optical axis is used. In the case of this configuration, using the second piezoelectric drive device 208 to drive the reference light objective lens 206 and the reference-light-forming mirror 207 jointly in the direction of the optical axis makes it possible to acquire a plurality of interference images using the image-capturing element 201 and to use this plurality of interference images to measure the height of the upper surface of the object 210 to be measured.

EXPLANATION OF NUMERALS AND CHARACTERS 10, 210: Object to be measured
20: Image-forming optical system
100, 200: Height-measuring device

The invention claimed is:

1. A height-measuring method comprising: moving an optical system relative to the object to be measured along an optical axis of an optical system; forming an image of the object to be measured on a surface; measuring a relative height of the object based on a change in brightness in the surface, and finding a correlation between a first property indicative of the change in brightness with respect to the relative movement of the optical system based on a portion of the first property where the change in brightness with respect to the relative movement of the optical system reaches a maximum value and a second property indicative of the change in brightness with respect to the relative movement of the optical system, and finding the relative height based on the correlation.

2. The height-measuring method according to claim 1, further comprising performing partial differentiation on a change in the correlation when the first property and the second property to find the amount of relative movement at which the correlation reaches a maximum; and determining the relative height based on the amount of relative movement.

3. A height-measuring method comprising: moving an optical system relative to the object to be measured along an optical axis of the optical system; forming an image of the object to be measured on a surface; capturing an image of the surface; measuring the relative height of the object based on repeatedly carrying out the relative movement of the optical system with respect to the object to be measured and the image-capturing; defining a second function on the basis of a first function fitted to a property including a position of the optical system on the optical axis and a light intensity value of a pixel, as obtained for individual pixels of each of the resulting plurality of images; and determining the relative height of the object at a position corresponding to the pixel using the position of the optical system on the optical axis when a correlation value between the property and the second function reaches a maximum value.

4. The height-measuring method according to claim 3, wherein the second function is a function in which an absolute value of a first-order differential function of the first function is squared.

5. The height-measuring method according to claim 3, wherein the second function is a function in which the first function has been multiplied by a constant.

6. The height-measuring method according to claim 2, further comprising determining a desired shift amount at which a value of zero is obtained by performing partial differentiation on a correlation value between the second function moved by the shift amount and the property to determine the relative height of the object to be measured at the position corresponding to the pixel.

7. A height-measuring device, comprising:
an optical system configured to form an image of an object to be measured;
a drive unit configured to move one of the object to be measured and the optical system relative to an other of the object to be measured and the optical system along an optical axis of the optical system;
a camera configured to capture an image; and
a controller configured to repeatedly carry out the relative movement and the image-capturing and determine the relative height of the object based on the captured images.

8. The height-measuring device according to claim 7, wherein the optical system is a microscope, and wherein an objective lens of the microscope is moved relative to the object to be measured along the optical axis and wherein the microscope is configured to scan the object to be measured to capture the image.

9. The height-measuring device according to claim 8, wherein the microscope is configured to be at least one of a dark field optical microscope, a polarizing microscope, a fluorescence microscope, a differential interference microscope, a two-beam interference microscope, a stereomicroscope, and a zoom microscope; and wherein the microscope includes a focal position movement mechanism, an image-capturing mechanism, and a control processor.

10. The height-measuring device according to claim 8, wherein the microscope is a two-beam interference microscope, and wherein an object-use objective lens is moved relative to the object to be measured along.

11. The height-measuring device according to claim 8, wherein the microscope is a two-beam interference microscope including a reference light objective lens and a reference-light-forming mirror, and wherein the reference light objective lens and the reference-light-forming mirror are jointly moved along the optical axis.

* * * * *